UNITED STATES PATENT OFFICE.

MAX ISLER AND FILIP KAČER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

ANTHRAQUINONE COMPOUND AND PROCESS OF MAKING SAME.

No. 863,397.　　　　Specification of Letters Patent.　　　Patented Aug. 13, 1907.

Application filed February 26, 1907. Serial No. 359,469. (Specimens.)

*To all whom it may concern:*

Be it known that we, MAX ISLER, chemist, and FILIP KAČER, doctor of philosophy and chemist, respectively a citizen of the Swiss Republic and a subject of the King of Prussia, residing at Mannheim, Germany, have invented new and useful Improvements in Anthraquinone Compounds and Process of Making the Same, of which the following is a specification.

Our invention consists in the manufacture and production of a new class of coloring matters, namely those in which three anthraquinone groups are joined together by means of nitrogen. These compounds we have termed dianthraquinonyl-diamido-anthraquinone compounds, and one of the simplest is regarded as possessing a constitution corresponding to the formula

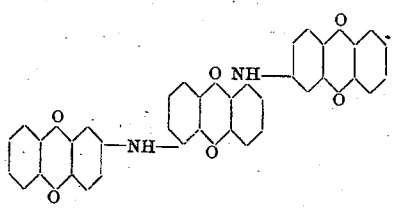

We have discovered that these new coloring matters can be obtained for instance by reacting with two molecular proportions of 2-chlor-anthraquinone on one molecular proportion of a diamido-anthraquinone, the particular coloring matter represented by the above formula being obtained when 1.5-diamido-anthraquinone is employed. Other diamido-anthraquinones which can be employed according to our invention are those obtainable by reducing the alpha- and the delta-dinitro-anthraquinones described in the specification of German patent No. 72,685.

The new coloring matters can also be obtained by reacting on a beta-beta-dihalogen-anthraquinone with 1-amido-anthraquinone, or with a derivative of the same, such for instance as 1.5-diamido-anthraquinone. As examples of beta-beta-dichlor-anthraquinones which can be used according to our invention we mention 2.6-dichlor-anthraquinone and 2.7-dibrom-anthraquinone, and these dihalogen-anthraquinones can be produced from the corresponding diamido-anthraquinones by replacing the amido groups by halogen by means of the Sandmeyer reaction, or from the alpha-alpha-diamido-beta-beta-dihalogen-anthraquinones by eliminating the amido groups in any desirable manner.

The new coloring matters which we wish to be understood as claiming generically are dianthraquinonyl-diamido-anthraquinone products and are in their unsulfonated form insoluble in water and in dilute acids and alkalies and difficultly soluble in most organic solvents. They are soluble in concentrated sulfuric acid yielding greenish solutions which upon being warmed turn bluer, and they are also soluble in alkaline hydrosulfite solutions yielding yellowish red to brown-red vats which dye cotton red shades of excellent fastness against the action of alkalies, acids, chlorin, and light.

The new coloring matter which we desire to be understood as claiming specifically is that which possesses a constitution represented by the formula hereinbefore given and in particular its solution in concentrated sulfuric acid is bottle-green, and turns greenish blue upon warming. In alkaline hydrosulfite solution it yields a yellowish red vat which dyes cotton red shades. These coloring matters can also be obtained in the form of their sulfoacids by treatment with sulfonating agents, such for instance as concentrated sulfuric acid, or fuming sulfuric acid, with, or without, the addition of boric acid, and the products so obtained dye wool from an acid bath, yielding from greenish gray, to red, shades.

The following examples will serve to illustrate further the nature of our invention and the way in which it can be carried into practical effect, but our invention is not confined to these examples. The parts are by weight.

*Example 1.*—Boil together in a reflux apparatus (for from fifteen (15), to twenty (20), hours) twenty (20) parts of 2-chlor-anthraquinone, ten (10) parts of 1.5-diamido-anthraquinone, fifteen (15) parts of anhydrous sodium acetate, three (3) parts of cuprous chlorid (or cupric chlorid) and six hundred (600) parts of naphthalene, or nitrobenzene. The new compound crystallizes out from boiling nitrobenzene. Filter while hot, and wash with toluene in order to remove nitrobenzene, or naphthalene, then treat with hydrochloric acid, or with glacial acetic acid, and finally with water. The residue consists of the compound represented by the formula hereinbefore given and it is practically insoluble in most organic solvents, such for instance as nitrobenzene, quinolin, and in glacial acetic acid. It is insoluble in water, in alkalies, and in hydrochloric acid. Concentrated sulfuric acid dissolves it, the solution being bottle-green which, upon warming, turns greenish blue. It is soluble in alkaline hydrosulfite, yielding a yellowish red vat which dyes cotton red shades.

*Example 2.*—Boil together in a reflux apparatus ten (10) parts of 2.6-dichlor-anthraquinone, seventeen (17) parts of 1-amido-anthraquinone, fifteen (15) parts of anhydrous sodium acetate, two (2) parts of cuprous chlorid, and one hundred and fifty (150) parts of nitrobenzene. When the formation of the coloring matter is complete, allow the mixture to cool, filter off the product and wash it successively with alcohol, water, dilute hydrochloric acid, and water. The coloring matter can be obtained in a finely divided state by dissolving it in sulfuric acid and precipitating it again with water.

*Example 3.*—Boil together in a reflux apparatus ten (10) parts of 2.7-dibrom-anthraquinone, twelve and one-fifth (12.2) parts of 1-amido-anthraquinone, fifteen (15) parts of anhydrous sodium acetate, two (2) parts of cuprous chlorid, and one hundred and fifty (150) parts of naphthalene. When the formation of the coloring matter is complete, add five hundred (500) parts of toluene, and after allowing to cool work up the mixture as described in the foregoing example 2.

*Example 4.*—Boil together in a reflux apparatus ten (10) parts of 2.6-dichlor-anthraquinone, eight and three-fifths (8.6) parts of 1.5-diamido-anthraquinone, twenty (20) parts of anhydrous sodium acetate, two (2) parts of cuprous chlorid and two hundred (200) parts of nitrobenzene. When the formation of the coloring matter is complete, work up the mixture as described in the foregoing example 2.

Now what we claim is:

1. The process of producing dianthraquinonyl-diamido-anthraquinone compounds by reacting on an amido-anthraquinone compound with a betahalogen-anthraquinone compound substantially as described.

2. The process of producing dianthraquinonyl-diamido-anthraquinone compounds by reacting on an amido-anthraquinone compound with a betahalogen-anthraquinone compound and treating the resulting product with a sulfonating agent substantially as described.

3. The process of producing coloring matter of the anthracene series by reacting on one molecular proportion of 1.5-diamido-anthraquinone with two molecular proportions of 2-chloranthraquinone.

4. The process of producing coloring matter of the anthracene series by reacting on one molecular proportion of 1.5-diamidoanthraquinone with two molecular proportions of 2-chloranthraquinone and treating the resulting product with a sulfonating agent.

5. As new articles of manufacture dianthraquinonyl-diamido-anthraquinone compounds which in the unsulfonated form are insoluble in water and in dilute acids and alkalies, difficultly soluble in most organic solvents, soluble in concentrated sulfuric acid yielding greenish solutions which solutions upon warming turn bluer, and are also soluble in alkaline hydrosulfite solutions yielding yellowish red to brown-red vats dyeing cotton substantively red shades and which in the sulfonated form dye wool from an acid bath yielding greenish gray to red shades.

6. As a new article of manufacture dianthraquinonyl-1.5-diamido-anthraquinone possessing a composition agreeing with the formula $$C_{42}H_{20}(NH)_2O_6$$

which is insoluble in water and in dilute acids and alkalies, difficultly soluble in most organic solvents, soluble in concentrated sulfuric acid yielding a bottle-green solution which solution turns greenish blue upon warming, and is also soluble in alkaline hydrosulfite solution yielding a yellowish red vat which dyes cotton red shades.

In testimony whereof we have hereunto set our hands in the presence of two subscribing witnesses.

MAX ISLER.
FILIP KAČER.

Witnesses:
ERNEST F. EHRHARDT,
H. W. HARRIS.